United States Patent
Klein et al.

(10) Patent No.: US 6,565,645 B1
(45) Date of Patent: May 20, 2003

(54) WATER-RESISTANT HYDRAULICALLY SETTING COMPOSITIONS

(75) Inventors: Johann Klein, Duesseldorf (DE); Gaby Schilling, Duesseldorf (DE); Thomas Fandel, Unna (DE); Wolfgang Klauck, Meerbusch (DE); Hans-Peter Sattler, Kamen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/673,385

(22) PCT Filed: Apr. 8, 1999

(86) PCT No.: PCT/EP99/03208

§ 371 (c)(1),
(2), (4) Date: Dec. 12, 2000

(87) PCT Pub. No.: WO99/54263

PCT Pub. Date: Oct. 28, 1999

(30) Foreign Application Priority Data

Apr. 17, 1998 (DE) .......................... 198 17 112

(51) Int. Cl.⁷ .................. C04B 11/00; C04B 24/00; C04B 24/12
(52) U.S. Cl. ............. 106/778; 106/725; 106/727; 106/808; 106/809; 106/810; 106/728; 106/781
(58) Field of Search ............... 106/725, 727, 106/808, 809, 810, 728, 778, 781

(56) References Cited

U.S. PATENT DOCUMENTS

| | | | |
|---|---|---|---|
| 2,131,533 A | 9/1938 | Daimler et al. | 106/27 |
| 4,371,399 A | 2/1983 | May et al. | 106/109 |
| 5,626,668 A | 5/1997 | Gerhardinger et al. | 106/781 |

FOREIGN PATENT DOCUMENTS

| | | |
|---|---|---|
| DE | 44 07 028 | 9/1995 |
| DE | 195 17 346 | 11/1996 |
| DE | 196 32 152 | 2/1998 |
| EP | 0 342 609 | 11/1989 |
| EP | 0 384 322 | 8/1990 |
| EP | 0 560 519 | 9/1993 |
| EP | 0 787 698 | 8/1997 |
| GB | 1 049 184 | 11/1966 |
| WO | WO97/08112 | 3/1997 |

OTHER PUBLICATIONS

Ullmanns Enzyklopaedie der technischen Chemie, vol. 12, 1976, No month.
Zement–Kalk–Gips, vol. 21, pp 415–419, 1968, No month.

*Primary Examiner*—Elizabeth D. Wood
(74) *Attorney, Agent, or Firm*—Stephen D. Harper; Daniel S. Ortiz

(57) ABSTRACT

A hydraulic setting composition is provided. The composition when set has improved water absorption properties. The composition contains a hydraulically setting inorganic material such as calcium sulfate and an auxiliary of the formula $A(-X[-CH_2]_p-ZY)_k$ where A can be a linear or branched $C_{1-24}$ alkyl group, a linlear or branched $C_{2-24}$ alkenyl group each of which can be unsubstituted or substituted with 1 to 4 OH group, $C_{6-24}$ aryl group and alkyl substituted $C_{6-24}$ aryl groups each; having a valance K, Z is $SO_3$ or $COO^-$, Y is a proton, a metal ion or ammonium, P is from 1 to 30 and X is identical or different and can be

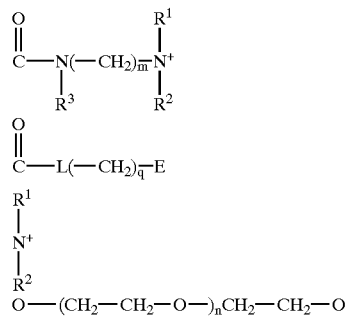

where n is from 0–30, m is from 2 to 8, K is from 1 to 4, q is from 1–10, L is O, S or $UR^3$, $R^2$ and $R^3$ are identical or different, linear or branched $C_{1-12}$ alkyl or a polymer having a molecular weight (Mn) of at least 300 and contains anionic, cationic or anionic and cationic monomer units.

24 Claims, No Drawings

WATER-RESISTANT HYDRAULICALLY SETTING COMPOSITIONS

The present invention relates to a hydraulically setting composition comprising specific auxiliaries, a process for preparing such a composition, the use of particular compounds as auxiliaries and the use of a composition according to the invention for producing shaped bodies and for specific building compositions, plasters and renders and knifing fillers.

Calcium sulfate as anhydrite or hemihydrate has long been, because of its ability to set on reaction with water (hydraulically), a valued raw material having many interesting properties, for example low shrinkage, a refractory nature and pH neutrality during curing. Furthermore, large amounts of gypsum are nowadays obtained from flue gas desulfurization and should be used in an environmentally friendly manner.

However, a disadvantage of set gypsum mortar, screeds and coatings is, for example, the relatively low water resistance of these systems. The exterior use of gypsum, for example as render, is a still unsolved problem today.

It is already known that gypsum can be waterproofed by means of specific hydrophobic polysiloxanes which are added in amounts of up to 2% by weight. However, this is disadvantageous in that the addition of polysiloxanes during production causes great environmental pollution due to their nonbiodegradability and their unfavorable ecobalance. In addition, the quality of gypsum products modified in this way is not satisfactory for external applications.

WO 97/08112 describes $CaSO_4$-containing compositions which comprise fatty additives for waterproofing, control of setting times, rheology, the water retention capability and elastification. The publication mentions many fats which are suitable for hydrophobicizing gypsum, including ester betaines. The amount used is disclosed as from 0.1 to 30% by weight.

DE-A 196 32 152 describes a process for producing insulation boards based on mineral and paper fibers. Here, mineral fibers, binders and customary additives are slurried in water, an insulation board is formed by application of the slurry to a screen and the insulation board is dried and consolidated. The publication describes the possibility of using, for example, betaines as surface-active additives, which improves dewatering and has a significant waterproofing effect on the surface of the dried insulation boards. Use of betaines for reducing the water penetration depth in hydraulically setting compositions is not described.

EP-A 0 787 698 discloses a composition comprising cement and a surfactant. It describes, inter alia, the use of amidopropylbetaine as foam stabilizer in foamed gypsum compositions. An improvement in the water resistance is not described in this publication.

Hydraulically setting compositions should not only have a good water resistance but also meet further requirements which have been able to be met only partially, if at all, by the compositions known hitherto. Furthermore, certain desirable properties often have to be abandoned in the case of the compositions known hitherto if another property is to meet particular requirements.

Thus, for example, the known waterproofing agents often lead to a deterioration in the handlability of the waterproofed compositions which are often difficult to introduce into water. The effect of the waterproofing agents in respect of the water resistance of the set compositions (shaped bodies) frequently leaves something to be desired. In general, large amounts of waterproofing agents have to be added in order to achieve satisfactory water resistance of the shaped bodies. However, the addition of water-proofing agents frequently leads to a drastic increase in the setting time, which cannot be justified by the only slight improvement in the water resistance. The addition of large amounts of waterproofing agents can also lead to a deterioration in the materials properties of the shaped bodies, which is undesirable. Moreover, the addition of waterproofing agents often leads to thickening of a mix of composition and water, i.e. the amount of a hydraulically setting, inorganic compound which can be mixed with water to achieve a consistency necessary for processing is less than would be the case for a comparable composition without waterproofing agent. This leads to increased pore volumes and thus generally to a higher water absorption capacity, as result of which the desired waterproofing effect is weakened and the water resistance of the shaped bodies is impaired. The addition of commercial fluidizers (for example sulfonated melamine-formaldehyde condensates) does generally lead to a reduction in the pore volume, but does not achieve a satisfactory reduction in the water absorption capacity.

In the present context, the term "pore volume" refers to the volume of the voids formed when the composition sets without additional introduction of air (i.e. without foam formation). The pore volume thus has a critical effect on the density and thus on the weight and the mechanical properties of the cured composition. Applications in which a high mechanical strength is necessary therefore generally require a cured composition having a low pore volume. Applications in which low weight is important correspondingly require larger pore volumes. However, in all the applications mentioned, there is a need for a low water absorption capacity of the cured shaped body. Hydraulically curing compositions having different pore volumes and unchanged, low water absorption capacity would therefore be desirable.

Users of such hydraulically setting compositions often wish, for example, to give the set composition a coarse-pored appearance. This effect can be achieved, for example, by addition of surfactants to the composition, leading to foam formation during stirring and thus formation of a porous structure. However, customary surfactants are frequently sensitive to calcium ions and form water-insoluble soaps which cannot contribute to foam formation. Furthermore, the addition of surfactants is often associated with an increased water absorption capability of the cured composition. (The term "coarse-pored" refers in the present context to generally approximately spherical pores which have been formed by introduction of air bubbles into the still fluid mixture of composition and water). There is therefore a need for compositions which allow production of coarse-pored shaped bodies which have a low water absorption capacity.

It is therefore an object of the present invention to provide a hydraulically setting composition which leads to sufficiently water-resistant solids without use of waterproofing agents. A further object of the invention is to provide a hydraulically setting composition which leads to solids having an unchanged, low water absorption capability at different pore volumes. It is also an object of the present invention to provide a hydraulically setting composition which makes it possible to produce coarse-pored shaped bodies which have a low water absorption capacity.

For the purposes of the present invention, a low water absorption capacity means a water absorption rate of not more than about 1 ml/(24 h*cm$^2$), as measured using a KARSTEN tube at a water column height of 15 cm.

It has now been found that hydraulically setting compositions which comprise auxiliaries in the form of at least largely water-soluble, ionic or aqueously ionizable compounds containing a carboxyl group and, in the β position relative to the carboxyl group, a polyether group (ether carboxylic acids) or a quaternary amino group (alkyl and amido betaines) do not have the disadvantages known from the prior art.

In particular, it has been found that hydraulically binding compositions comprising auxiliaries of the abovementioned type display low water absorption, display only a slight decrease in compressive strength after storage in water and redrying (compared to the initial compressive strength) and have a constantly low water absorption rate at different pore volumes. It has also been found that the proportion of auxiliaries is lower compared to conventional waterproofing agents known from the prior art for equal or better results and the influence on the mechanical properties is therefore less.

The present invention provides a hydraulically setting composition comprising from about 20 to about 99.9% by weight of a hydraulically setting, inorganic substance, from about 0 to about 79.95% by weight of additives and from about 0.05 to about 30% by weight of an auxiliary, wherein the auxiliary present is a) at least one compound of the formula I

$$A(-X[-CH_2]_p-ZY)_k \qquad (I),$$

where A is a linear or branched $C_{1-24}$-alkyl or $C_{2-24}$-alkenyl radical which may be unsubstituted or substituted by from 1 to 4 OH groups or is an unsubstituted or alkyl-substituted $C_{6-24}$-aryl radical, each having the valence k, Z is $SO_3^-$— or $COO^-$, Y is a proton, a metal ion, in particular an alkali metal or alkaline earth metal ion, or an ammonium ion, p is from 1 to about 30 and X are identical or different and are each, independently of one another,

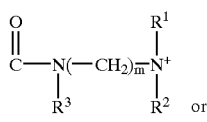

(II)

or

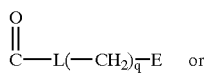

(III)

or

(IV)

where E is

$$O-(CH_2-CH_2-O-)_n CH_2-CH_2O \qquad (V),$$

n is from 0 to 30, m is from 2 to 8, k is from 1 to about 8, q is from 1 to 10, L is O, S or $NR^3$, $R^1$ and $R^2$ are identical or different and are each, independently of one another, a linear or branched $C_{1-12}$-alkyl radical and $R^3$ is H or a linear or branched $C_{1-12}$-alkyl radical or b) a polymer having a molecular weight ($M_n$) of at least 300 which contains at least one cationic group or at least one cationic and one anionic group or bears only anionic groups and is built up to an extent of from 2 to 90 mol % of monomers containing at least one anionic group, or a mixture of two or more thereof, or a mixture of a) and b).

Examples of hydraulically setting, inorganic substances are cement, hydraulic lime and calcium sulfate. In a preferred embodiment of the invention, calcium sulfate is used as hydraulically setting, inorganic substance.

The main component used in the composition of the invention is therefore preferably calcium sulfate as anhydrite or hemihydrate in all possible chemical modifications (α- and β-hemihydrate, anhydrite I, II, III) and based on natural gypsum, chemical gypsum or gypsum from flue gas desulfurization. In principle, these hydraulically setting versions of $CaSO_4$ can be present in pure form or in admixture.

In the case of natural gypsum, use is usually made of β-calcium sulfate hemihydrate as is obtained by the rotary furnace process or the large-capacity cooker process. A corresponding multiphase calcium sulfate is obtained by the tunnel kiln process and an α-calcium sulfate hemihydrate is obtained by the autoclave process.

In the case of the types of calcium sulfate used in the form of chemical calcium sulfate, β-calcium sulfate hemihydrate is obtained by the Knauf rotary furnace process, the Knauf large-capacity cooker process and by the large-capacity cooker process without recrystallization. A corresponding multiphase calcium sulfate is obtained as chemical calcium sulfate by the Knauf large-capacity kiln process and an α-calcium sulfate hemihydrate is obtained by the Giulini autoclave process.

Nowadays, however, a large proportion of calcium sulfate comes from flue gas desulfurization, where, for example in 1990, about 2 million metric tons of gypsum residues were produced by the Bischoff process, the Saarberg-Hölter process and the Mining Research process. Here, the α-hemihydrate from FGD gypsum (FGD=flue gas desulfurization) has become particularly important.

In a first preferred embodiment of the invention, a compound of the formula I

$$A(-X[-CH_2]_p-ZY)_k \qquad (I),$$

in which A is, in particular, a linear or branched $C_{1-23}$-alkyl or $C_{2-23}$-alkenyl radical which may be unsubstituted or substituted by from 1 to 4, preferably 0, 1 or 2, OH groups or is an unsubstituted or alkyl-substituted $C_{6-24}$-aryl radical, each having a valence of k, Z is $SO_3^-$— or $COO^-$, Y is a proton, a metal ion, in particular an alkali metal or alkaline earth metal ion, or an ammonium ion, p is from 1 to about 30 and X is a radical of the formula II

(II)

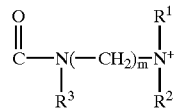

which has already been indicated above, is used as auxiliary. In a preferred embodiment, p is 1, but higher values for p are also possible, for example from 2 to about 25, in particular from 2 to about 10.

The compounds of a first preferred embodiment in which p is 1, are hereinafter referred to as amido betaines.

Amido betaines are preferably obtained by amidation of linear or branched, substituted or unsubstituted $C_{1-24}$-alkanoic acids by diamino compounds and subsequent quaternization using chloroacetic acid.

As alkanoic acids, it is possible to use, for example, formic, acetic, propionic, butyric, valeric, caproic, enanthic, caprylic, pelargonic, capric, undecanoic, lauric, tridecanoic, myristic, pentadecanoic, palmitic, margaric, stearic, nonadecanoic, arachidic, behenic, lignoceric, cerotic and melissic acid, benzoic acid, substituted benzoic acid derivatives, 4-hydroxybenzoic acid, dichloropropionic acid, 2-hydroxypropionic acid, 3-hydroxypropionic acid, hydroxyacetic acid, salicylic acid, chlorovaleric acid, 4-hydroxybutyric acid, mandelic acid, phenylacetic acid, gallic acid or cinnamic acid.

Likewise suitable are aliphatic or aromatic polycarboxylic acids having up to 4 carboxyl groups, for example propanedicarboxylic acid, butanedicarboxylic acid, pentanedicarboxylic acid, hexanedicarboxylic acid, heptanedicarboxylic acid, octanedicarboxylic acid, oxalic acid, malonic acid, succinic acid, pimelic acid, maleic acid, fumaric acid, suberic acid, 1,11-undecanedioic acid, 1,12-dodecanedioic acid, phthalic acid, isophthalic acid, terephthalic acid, tetrachlorophthalic acid, hexahydrophthalic acid, tetrahydrophthalic acid, dimer fatty acid, trimer fatty acid, tartronic acid, malic acid, acetylenedicarboxylic acid, tartaric acid, citric acid, trimellitic acid or benzenetetracarboxylic acid.

In a preferred embodiment, the radical A of the amido betaines is derived from $C_{8-24}$-fatty acids, as are obtainable, for example, from oils and fats. Since the carboxyl group from the fatty acids mentioned is already present in the radical X (amide group), the number of carbon atoms in the radical A is 1 less than the number of carbon atoms in the fatty acid used. If, for example, a fatty acid having 16 carbon atoms is used for preparing an amido betaine, then A in the abovementioned formula I is an alkyl radical having 15 carbon atoms.

For the purposes of the present invention, oils and fats are naturally occurring oils and fats, in particular those of vegetable and animal origin.

These occur in nature in the form of natural mixtures of different fatty acid glycerides, for example in the form of palm oil, palm nut oil, palm stearates, olive oil, rapeseed oil, coriander oil, sunflower oil, cottonseed oil, peanut oil, linseed oil, lard oil, fish oil, fish liver oil or lard.

The naturally occurring oils and fats generally do not yield identical fatty acids, but mixtures of fatty acids having different chain lengths, branching, functional groups or unsaturated parts of the molecule. For this reason, the term fatty acid fractions is generally used. For the purposes of the present invention, it is possible to use amido betaines based on either pure fatty acids (fatty acids having an identical molecular structure) or fatty acid fractions. However, preference is given to using amido betaines based on fatty acid fractions, in particular on fatty acid fractions having a predominant proportion of fatty acids having from 8 to 16 carbon atoms.

Examples of saturated fatty acids having from 8 to 24 carbon atoms are: caproic, caprylic, capric, lauric, myristic, palmitic, stearic, arachinic, behenic, cerotic, pentadecanoic, margaric, tridecanoic and lignoceric acids. Examples of unsaturated fatty acids having from 8 to 24 carbon atoms are: myristoleic, palmitoleic, oleic, elaidic, petroselic, erucic, linoleic, linolenic, arachidonic, clupanodonic, docosahexenoic, eicosapentenoic and gadoleic acids.

Owing to their high natural proportion of saturated fatty acids, a preferred embodiment of the present invention uses amido betaines based on fatty acid fractions obtained from coconut oil, palm nut oil or beef tallow, i.e. in which A represents alkyl chains having a predominant proportion of chains having from about 7 to about 15 carbon atoms.

Diamino compounds suitable for forming the amido betaines are, for example, diamino compounds having one tertiary N atom and one primary or secondary N atom. Here, the tertiary N atom bears the radicals $R^1$ and $R^2$ which are, independently of one another, identical or different, linear or branched $C_{1-10}$-alkyl radicals. The second N atom correspondingly bears a hydrogen atom and the radical $R^3$ which is hydrogen or a linear or branched $C_{1-10}$-alkyl radical.

m is preferably from 2 to about 6, in particular 2 to 4, for example 3 or 4.

Examples of such diamino compounds are N,N-dimethylethylenediamine, N,N-dimethylpropylene-1,3-diamine, N,N-dimethyl-N'-methylpropylene-1,3-diamine, N,N-diethylpropylene-1,3-diamine, N,N-diethyl-N'-methylpropylene-1,3-diamine, N-methyl-N-ethylethylenediamine, N-methyl-N-ethylpropylene-1,3-diamine, N,N-diethyl-N'methylpropylene-1,3-diamine, N,N-dimethylbutylene-1,4-diamine, N-methyl-N-ethylbutylene-1,4-diamine, N,N-diethyl-N'-methylbutylene-1,3-diamine, N,N-dimethyl or N,N-diethyl derivatives of hexamethylenediamine, 1,2-diaminocyclohexane, 1,4-diaminocyclohexane, 1,3-diamino-2,2-dimethylpropane, 2,5-diamino-2,5-dimethylhexane, 1,10-diaminodecane, 1,4-diaminobutane, 12-diaminododecane, diamine from dimer fatty acid, 1,8-diaminooctane, 1,8-diamino-p-menthane, 1,5-diaminopentane, 1,3-diamino-2-propanol, 1,3-diaminoadamantane, phenylenediamine, diaminobenzene and the like.

The final step leading to the amido betaines after the amidation is quaternization of the tertiary nitrogen atom by alkylation using a haloacetic acid or a corresponding C-halosulfonic acid, advantageously using chloroacetic or bromoacetic acid.

If other halocarboxylic acids, for example 3-halopropionic acid, 4-halobutanoic acid, 5-halopentanoic acid or the corresponding higher homologues, in place of the haloacetic acids, compounds of the formula I in which p is greater than 1, for example 2, 3 or 4, are obtained. This applies analogously to the use of other C-halosulfonic acids.

Suitable C-halosulfonic acids are, for example, 2-chlorosulfonic acid and 3-chloropropanesulfonic acid. The sulfo betaines can also be obtained, for example, by reaction with sultones such as 1,4-butanesultone or 1,3-propanesultone.

The amido betaines and further compounds of the formula I which can be used for the purposes of the present invention are not restricted to the method of preparation described above by way of example. It is possible to use all amido betaines and further compounds of the formula I, regardless of the method of preparation.

In a particularly preferred embodiment of the invention, m is 3 or 4 and $R^1$ and $R^2$ are each, independently of one another, $CH_3$ or $CH_3$—$CH_2$.

In a further preferred embodiment of the invention, a compound of the formula I

 (I), in which A is, in particular, a linear or branched $C_{1-23}$-alkyl or $C_{2-23}$-alkenyl radical which may be unsubstituted or substituted by from 1 to 4, preferably 1 or 2, OH groups or is an unsubstituted or alkyl-substituted $C_{6-24}$-aryl radical, each having a valence of k, Z is $SO_3^-$ or $COO^-$, Y is a proton, a metal ion, in particular an alkali metal or alkaline earth metal ion, or an ammonium ion, p is from 1 to about 30 and X is a radical of the formula III

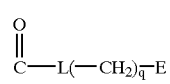 (III)

and E is a radical of the formula V

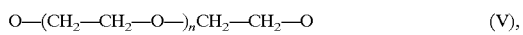  (V), is used as auxiliary. L is, for example, O or NR³, where R³ is, in particular, H. In a preferred embodiment of the invention, L is NH.

Compounds of this type are generally referred to as amido carboxylic or amido sulfonic acids or ester ether carboxylic or ester ether sulfonic acids, but in the interest of simplicity they will hereinafter be referred to simply as ether carboxylic or ether sulfonic acids.

Ether carboxylic acids of the abovementioned type can be obtained, for example, by reaction of one of the alkanoic acids or aromatic carboxylic acids mentioned above, in particular one of the abovementioned fatty acids or fatty acid fractions, with a diol (to form the monohydroxy ester) or a primary or secondary amino alcohol (to form the amide, where the OH group may be provided with an appropriate protective group), subsequent ethoxylation and subsequent reaction with a haloalkanoic acid.

Suitable fatty acids are, for example, caproic acid, caprylic acid, pelagonic acid, capric acid, lauric acid, myristic acid, stearic acid, gadoleic acid, oleic acid and behenic acid.

Suitable diols are, for example, 1,2-ethanediol, 1,2-propanediol, 1,3-propanediol, 1,4-butanediol, 2,3-butanediol, 1,5-pentanediol, 1,6-hexanediol, 1,8-octanediol and diethylene glycol.

Suitable amino alcohols are, for example, ethanolamine, propanolamine, butanolamine, pentanolamine, hexanolamine and the N-alkyl derivatives, in particular the N-methyl or N-ethyl derivatives, of the abovementioned amino alcohols.

The amino alcohols are preferably selected so that q is from 2 to about 6, in particular 2, 3 or 4.

For further processing, preference is given to using the reaction products of fatty acids having from about 8 to about 18 carbon atoms with the abovementioned amino alcohols, in particular the amides which are obtainable from naturally occurring or synthetically prepared fatty acids and fatty acid fractions by reaction with aminoethanol. Very particular preference is given to the monoethanolamides from coconut oil fatty acid fractions, in particular the $C_{8-14}$-fatty acid fractions, and ethanolamine.

The hydroxy esters or hydroxy amides obtainable in this way are subsequently ethoxylated using customary techniques and then reacted with halocarboxylic acids or converted into the ether carboxylic acid by oxidation of the terminal OH group.

The degree of ethoxylation should be at least about 1, i.e. n can be 0 in the abovementioned formula V. The upper limit for n can be about 30, but is preferably about 25 or less. For example, alkyl ether carboxylic acids in which n is from 5 to 20 are suitable. Good results can be obtained, for example, when n is from about 8 to about 14, in particular 10, 11, 12 or 13.

Subsequent to the ethoxylation, the compound obtained is preferably reacted with chloroacetic acid to obtain the ester ether carboxylic acid or the amido ether carboxylic acid or the corresponding sulfonic acids.

In a further preferred embodiment of the present invention, a compound of the abovementioned formula I in which A is, in particular, a linear or branched $C_{1-24}$-alkyl or $C_{2-24}$-alkenyl radical which may be unsubstituted or substituted by from 1 to 4, preferably 0, 1 or 2, OH groups or is an unsubstituted or alkyl-substituted $C_{6-24}$-aryl radical, each having a valence of k, Z is $SO_3^-$ or $COO^-$, Y is a proton, a metal ion, in particular an alkali metal or alkaline earth metal ion, or an ammonium ion, p is from 1 to about 30 and X is a radical of the formula V

  (V), can be used as auxiliary.

Compounds of this type are referred to as alkyl ether carboxylic acids or alkyl ether sulfonic acids for the purposes of the present invention.

The alkyl ether carboxylic or alkyl ether sulfonic acids which can be used for the purposes of the present invention can be obtained, for example, by ethoxylation of cyclic, linear or branched, saturated or unsaturated $C_{1-24}$-alcohols with subsequent O-alkylation by haloacetic acid or C-halosulfonic acid.

Suitable alcohols are, for example, the lower $C_{1-7}$-monoalcohols such as methanol, ethanol, 1-propanol, 2-propanol, 1-butanol, 2-butanol, 2-methylpropan-2-ol, the isomeric pentanols, hexanols and heptanols and also mixtures of two or more thereof. Likewise suitable are corresponding cyclic alcohols such as cyclobutanol, cyclopentanol, cyclohexanol or cycloheptanol and mixtures of two or more thereof. Mixtures of linear and cyclic alcohols are also suitable.

Likewise suitable are polyhydric alcohols, for example 1,2-ethanediol, 1,2-propanediol, 1,3-propanediol, 1,4-butanediol, 2,3-butanediol, 1,5-pentanediol, 1,6-hexanediol, 1,8-octanediol, diethylene glycol, neopentyl glycol, 1,4-bishydroxymethylcyclohexane, 2-methyl-1,3-propanediol, 1,2,6-hexanetriol, glycerol, diglycerol, polyglyerol, trimethylolpropane, trimethylolethane, pentaerythritol, sorbitol, formitol, methyl glycoside, dimer diol, trimer triol, glucose, alkyl polyglucosides, disaccharides and polysaccharides. All the alcohols mentioned can also be used as EO or PO adducts. Polyethylene glycols, polypropylene glycols and polybutylene glycols, cyclohexanediol, EO/PO block copolymers (Pluronic or Pluriol grades) are also useful.

Depending on the number of OH groups of the polyhydric alcohols used, k in the formula I is from 2 to about 8.

Linear or branched $C_{8-24}$-monoalcohols, in particular saturated fatty alcohols having from 8 to 24 carbon atoms, preferably from 8 to 22 carbon atoms, are likewise suitable for preparing the alkyl ether carboxylic acids which can be used for the purposes of the present invention.

Examples of such fatty alcohols, which are synthesized industrially by, for example, reduction (hydrogenation) of methyl esters of fatty acids, are: 2-ethylhexanol, caproyl alcohol, capryl alcohol, pelargonic alcohol, capric alcohol, lauryl alcohol, myristyl alcohol, cetyl alcohol, stearyl alcohol, gadoleyl alcohol and behenyl alcohol.

The alcohols mentioned can generally be prepared by known ethoxylation techniques, for example by alkali-catalyzed reaction of the alcohol with ethylene oxide.

The degree of ethoxylation should be at least about 1, i.e. n can be 0 in the abovementioned formula V. The upper limit for n should be about 30, but is preferably about 25 or less. For example, alkyl ether carboxylic acids in which n is from 5 to 20 are suitable. Good results can be achieved, for example, when n is from about 8 to about 14, in particular 10, 11, 12 or 13.

The ether alcohol obtained after the ethoxylation can, for example, be reacted with bromoacetic acid or with chloroacetic acid to form the ether carboxylic acid.

The above-described methods of preparing ester carboxylic acids, amido carboxylic acids and alkyl ether carboxylic acids are mentioned purely by way of example; a person skilled in the art will know further ways of preparing them. For the purposes of the present invention, any ether carboxylic acid of the formula I in which X is a radical of the abovementioned formula III or V can be used, regardless of the method by which it has been prepared.

In a further, preferred embodiment, a compound of the abovementioned formula I in which A is, in particular, a linear or branched $C_{1-24}$-alkyl or $C_{2-24}$alkenyl radical which may be unsubstituted or substituted by from 1 to 4, preferably 1 or 2, OH groups or is an unsubstituted or alkyl-substituted $C_{6-24}$-aryl radical, each having a valence of k, Z is $SO_3^-$ or $COO^-$, Y is a proton, a metal ion, in particular an alkali metal or alkaline earth metal ion, or an ammonium ion, p is from 1 to about 30 and X is a radical of the formula IV

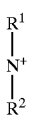

(IV)

can be used as auxiliary.

p is preferably 1. Such compounds will hereinafter be referred to as alkyl betaines.

The alkyl betaines can be prepared, for example, by reacting a tertiary amine with haloacetic acid or C-halosulfonic acid. Particularly suitable tertiary amines are amines having from 1 to about 24 carbon atoms, which may, depending on the number of carbon atoms, be cyclic, linear or branched, saturated or unsaturated.

Examples of suitable tertiary amines are trimethylamine, ethyldimethylamine, propyldimethyl-1-amine and the 2-isomer thereof, butyldimethyl-1- and -2-amine, the isomeric pentyldimethylamines and hexyldimethylamines and further mixed tertiary amines such as propylethylmethylamine, diethylmethylamine and the like.

Tertiary fatty amines are likewise suitable. Fatty amines can be produced, for example, by amidation of the abovementioned fatty acids using ammonia, the subsequent conversion into the nitrile and reduction to form the amine. The appropriate techniques are known to those skilled in the art. Alkylation of fatty amines using known alkylation agents, for example methyl iodide, ethyl iodide, propyl iodide, butyl iodide, dimethyl sulfate or diethyl sulfate, gives the corresponding tertiary alkylamines. The alkyl betaines which can be used for the purposes of the composition of the invention can then be obtained by alkylation of the tertiary amines by means of chloroacetic or bromoacetic acid.

The alkyl betaines preferably have from 1 to about 16 carbon atoms. An example of a particularly suitable alkyl betaine is trimethyl betaine.

If other halocarboxylic acids, for example 3-halopropionic acid, 4-halobutanoic acid, 5-halopentanoic acid or the corresponding higher homologues, are used in place of haloacetic acid, the products are compounds of the formula I in which p is greater than 1, for example 2, 3 or 4.

The same applies analogously when using C-halosulfonic acids.

In a preferred embodiment of the invention, k in the abovementioned formula I is 1.

In a further, preferred embodiment, polymers bearing cationic groups or polymers bearing cationic and anionic groups (zwitterionic polymers) or polymers bearing only anionic groups and made up to an extent of at least from 2 to 90 mol % of monomers containing at least one anionic group can be used as auxiliaries. These polymers have a molecular weight $M_n$ of >300.

For the purposes of the present invention, a "cationic group" is a protonatable or positively charged functional group such as an amino or quaternary ammonium function.

An "anionic group" is a deprotonatable functional group or a salt thereof, for example a carboxyl, sulfonic acid or phosphonic acid function.

In a further, preferred embodiment, polymers bearing cationic groups, having a molecular weight $M_n$ of >300 and made up to an extent of from 2 to 90 mol %, preferably from 5 to 80 mol %, in particular from 10 to 60 mol %, of monomers containing at least one cationic group can be used as auxiliaries.

Further polymers which can be used as auxiliaries are polymers bearing anionic groups, having a molecular weight $M_n$ of >300 and made up to an extent of from 2 to 90 mol %, preferably 5–80 mol %, in particular 10–60 mol %, of monomers containing at least one anionic group.

In a further, preferred embodiment of the invention, zwitterionic polymers having a molecular weight $M_n$ of >300 and comprising from 2 to 90 mol % of monomers bearing anionic groups and from 2 to 90 mol % of monomers bearing cationic groups, preferably from 5 to 80 mol % of monomers bearing anionic groups and from 5 to 80 mol % of monomers bearing cationic groups, in particular from 10 to 60 mol % of monomers bearing anionic groups and from 10 to 60 mol % of monomers bearing cationic groups, i.e. containing both cationic and anionic groups, can be used as auxiliaries.

The polymers which can be used according to the invention as auxiliaries can be obtained by free-radical, cationic, anionic or transition metal-catalyzed polymerization, polycondensation or poly-addition; for example, they can be appropriately functionalized polyesters, polyamides, polyurethanes, proteins, alkyd resins or polyacrylates. The polymers can be homopolymers, copolymers or terpolymers.

The cationic or anionic groups can also be introduced subsequently in a polymer-analogous reaction, e.g. by saponification of ester groups or quaternization of tertiary amino groups.

Examples of monomers which are suitable for introducing a cationic group and are polymerizable by free-radical, cationic, anionic or transition metal-catalyzed polymerization are dimethylaminoethyl methacrylate, dimethylaminopropylmethacrylamide, dimethylaminoethyl acrylate, diethylaminoethyl methacrylate, diallyldimethylammonium chloride (DADMAC), diallyldiethylammonium chloride, methacrylamidopropyltrimethylammonium chloride (MAPTAC) and tertbutylaminoethyl methacrylate and the quaternization products obtained therefrom using reagents such as methyl chloride, ethyl chloride and dimethyl sulfate.

Examples of corresponding monomers suitable for introducing an anionic group are acrylic acid, methacrylic acid, crotonic acid, 2-acrylamido-2-methylsulfonic acid (AMPS), vinylphosphonic acid, vinylsulfonic acid, styrenesulfonic acid, 2-sulfoethyl methacrylate and allylsulfonic acid and their salts.

Suitable neutral monomers are, for example: derivatives of acrylic acid, methacrylic acid and cyanoacrylic acid, e.g. methyl acrylate, ethyl acrylate, isobutyl acrylate, 2-ethylhexyl acrylate, hexanediol diacrylate, tetraethylene glycol diacrylate, trimethylolpropane triacrylate, acrylamide, N-methylolacrylamide, methylenebisacrylamide, tert-octylacrylamide or N-isobutoxymethylacrylamide, vinyl esters such as vinyl acetate, vinyl propionate, vinyl versatate or vinyl stearate, maleic esters such as dibutyl maleate or diethyl maleate, vinyl ethers, vinyl chloride, α-olefins, butadiene, styrene and vinylpyrrolidone.

Examples of monomers which are suitable for introducing a cationic group and can be polymerized by polyaddition are: 2-(N,N-dimethylamino)ethylamine, N-methyldiethanolamine, N-methyldiisopropanolamine, N-ethyldiethanolamine, N-ethyldiisopropanolamine, N,N'-bis(2-hydroxylethyl)perhydropyrazine, N,N',N"-trimethyldiethylenetriamine, N,N-diethylaminoethanol, dimethylolpropionic acid dimethylaminopropylamide, dimethylolpropionic acid tetramethylammoniumpropylamide, ricinoleic acid dimethylaminopropylamide and 9,10-dihydroxystearic acid dimethylaminopropylamide and their quaternized derivatives.

Examples of corresponding monomers suitable for introducing an anionic group are: dimethylolpropionic acid and 9,10-dihydroxystearic acid.

Examples of neutral monomers are: alcohols such as methanol, ethanol, propanol, butanol, pentanol, decanol, octadecanol, 2-ethylhexanol, 2-octanol, ethylene glycol, propylene glycol, trimethylene glycol, tetramethylene glycol, 2,3-butylene glycol, hexamethylenediol, octamethylenediol, neopentyl glycol, 1,4-bishydroxymethylcyclohexane, guerbetyl alcohol, 2-methyl-1,3-propanediol, 1,2,6-hexanetriol, glycerol, trimethylolpropane, trimethylolethane, pentaerythritol, sorbitol, formitol, methyl glycoside, butylene glycol, the reduced dimer and trimer fatty acids or the higher polyethylene glycols, polypropylene glycols and polybutylene glycols, polyisocyanates such as tolylene 2,4- and 2,6-diisocyanate and also any mixtures of these isomers (TDI), diphenylmethane diisocyanates (MDI), polyphenylpolymethylene polyisocyanates as are prepared by aniline-formaldehyde condensation and subsequent phosgenation or polyisocyanates containing carbodiimide groups, urethane groups, allophanate groups, isocyanurate groups, urea groups or biuret groups ("modified polyisocyanates"), in particular modified polyisocyanates derived from tolylene 2,4- and/or 2,6-diisocyanate or diphenylmethane 4,4'- and/or 2,4-diisocyanate, and polyepoxides such as bisphenol A diepoxide.

Examples of monomers which are suitable for introducing cationic groups and can be polymerized by polycondensation are: ornithine, citrulline, arginine, lysine, histidine, tryptophan and monofunctional or polyfunctional amines such as hexamethylenediamine, ethylenediamine and triethanolamine.

Examples of anionic monomers are: aspartic acid, glutamic acid, saturated, unsaturated and branched fatty acids, adipic acid, dimethylolpropionic acid, dimer fatty acid, phthalic acids, maleic acid, succinic acid, trimellitic acid and abietic acid. In a preferred embodiment, the auxiliary comprises polyaspartic acid.

Examples of suitable neutral monomers are: glycine, alanine, aspargine, phenylalanine, tyrosine, proline, serine, threonine, cysteine, methionine, monofunctional and polyfunctional alcohols, as have been described for polyaddition and 1-aminoundecanoic acid.

The polymers listed can be subjected to a polymer-analogous reaction and post-crosslinking reactions.

A particularly suitable auxiliary for a composition according to the invention is a polymer obtainable by copolymerization of acrylic acid or methacrylic acid or a mixture thereof with at least one compound bearing a quaternary or quaternizable N atom.

In a further preferred embodiment, the polymer can be a terpolymer bearing not only carboxyl groups and quaternary amino groups but also ester groups. Such polymers can be obtained, for example, by copolymerization of suitable abovementioned components with esters of carboxylic acids having at least one free-radically polymerizable olefinically unsaturated double bond (neutral monomers). A terpolymer which is particularly useful and is preferred for the purposes of the present invention is a terpolymer based on esters of acrylic or methacrylic acid with linear monofunctional alcohols having from 1 to 10 carbon atoms, in particular the esters of acrylic or methacrylic acid with methanol, ethanol, 1-propanol, 1-butanol or 1-pentanol.

In a particularly preferred embodiment, the polymer is a terpolymer obtainable by copolymerization of ethyl acrylate, methacrylamidopropyltrimethylammonium chloride (MAPTAC) and acrylic acid.

The polymer preferably has a molecular weight ($M_n$) of from about 300 to about 100 000, in particular from about 500 to about 50 000, for example from about 1000 to about 10 000 or more, for example from about 20 000 to about 30 000.

The compounds which are suitable as auxiliary and have been mentioned in this text can in principle be used individually or as a mixture of two or more of the specified compounds as auxiliary.

The proportion of auxiliary in the composition of the invention is preferably from about 0.1 to about 20% by weight, based on the total weight of the composition. The proportion of auxiliary is advantageously from about 0.1 to about 10% by weight, in particular from about 0.1 to about 6 or about 3% by weight. Good results can be obtained, for example, in a range from about 0.15 to about 2% by weight, for example at about 0.2, 0.3, 0.5, 0.7, 0.9 or 1% by weight or somewhat above, for example about 1.3, 1.5 or 1.7% by weight.

As stated further below, the proportion of auxiliary necessary for achieving a particular effect in terms of the desired properties of the composition can be higher in the presence of particular additives than would be the case for a composition without the corresponding additive.

Apart from the auxiliary consisting of one or more of the abovementioned components, the compositions of the invention may further comprise one or more additives. The additives serve to give certain desired properties which cannot be achieved to the desired extent, if at all, by means of the auxiliaries.

In the composition of the invention, the additives are preferably present in an amount of from about 0 to about 79.95% by weight, in particular from about 5 to about 60% by weight, for example from about 10 to about 40% by weight.

For the purposes of the present invention, additives are, for example, rheological aids, solvents, antifoams, accelerators, fillers, driers, dyes, preservatives, rust inhibitors, waterproofing agents or pigments.

Rheological aids which may be present in the compositions of the invention are compounds which influence the rheology of the composition when it is or has been mixed with water. Examples of such rheological aids are thixotropes or fluidizers.

If desired, the compositions of the invention may comprise a solvent to aid complete dissolution of the auxiliary. Examples of solvents suitable for this purpose are mono or dihydric alcohols or ether alcohols having up to about 8 carbon atoms. Preference is given to dihydric alcohols, for example ethylene glycol, propylene glycol, butylene glycol, pentanediol, hexanediol, cyclohexanediol or end-capped ether alcohols such as diethylene glycol monomethyl ether or castor oil ethoxylates.

The solvents are present in the compositions of the invention in amounts of from about 0 to about 5% by weight, in particular up to about 3% by weight.

Since the auxiliaries to be used according to the invention may lead to foam formation when the composition is stirred into water, it may be necessary in some cases to add an antifoam to the composition to control foam formation. Suitable antifoams are in principle all customary antifoams, for example ones based on silicone or based on fatty alcohols. For the purposes of the present invention, preference is given to using Agitan P 803 (manufacturer: Münzing Chemie) or Silipur R 2971 (manufacturer: Aqualon).

Owing to the generally small amount of auxiliary in the composition of the invention, it is generally necessary to use only a small amount of antifoam, or none at all.

The antifoams are therefore present in the composition of the invention in an amount of from 0% by weight to about 5% by weight, preferably in an amount of up to about 2% by weight or less, for example about 0.5 or 1% by weight.

The composition of the invention may further comprise accelerators as additives.

If the composition of the invention needs to have a short setting time, it can be advantageous for the composition to comprise up to about 10% by weight of accelerators. Suitable accelerators are, in particular, many inorganic acids and their salts, in particular sulfuric acid and its salts. Calcium sulfate dihydrate occupies a special position as accelerator, since it has a strongly accelerating effect when finely divided. It is assumed that the accelerating action of these substances is based on an increase in the solubility or the dissolution rate of the calcined gypsum or on an increase in the nucleation rate.

In the composition of the invention, accelerators are present in a proportion of from about 0 to about 10% by weight, in particular from about 0.5 to about 7% by weight.

Further additives which may be constituents of the composition of the invention are, for example, customary fillers and aggregates, which vary according to the application. These are first and foremost mineral and/or inorganic fillers such as sand, for example pit sand, river sand or quartz sand, mica, vermiculites, pearlites, expanded clay, foamed glass, diatomaceous earth, gravel, cement, slag, glass, silica gels, sulfates, oxides (e.g. magnesium oxide, calcium oxide), carbonates, e.g. limestone, chalk, marble, dolomite, recycled mineral materials, e.g. crushed brick, ground building rubble, glass and mineral fibers, plastic fibers, hollow microspheres, lightweight organic fillers (e.g. polystyrene foam), finely ground material from recycling plants, paper powder, wood shavings and wood flour, cork, ground cork, rubber and rubber scrap, cellulose fibers and the like.

The proportion of fillers and aggregates in the composition of the invention can be, for example, from about 10 to about 65% by weight.

In connection with the use of fillers and aggregates, it may have to be noted that more auxiliary might be needed to achieve particular desired properties when particular fillers and aggregates are present in the composition of the invention. This additional requirement is based on a comparison between a combination of inorganic, hydraulically setting compound and auxiliary alone and a combination of inorganic, hydraulically setting compound and auxiliary plus the corresponding additive. Such an additional requirement may arise, in particular, when ionic compounds or compounds which dissociate at least partially in water are used as additive.

Further additives which can be added are, for example, driers as are customarily used in paints, varnishes and printing inks. According to DIN 55901 (March 1988), these are metal salts of organic acids which are soluble in organic solvents and binders and are added to products which dry oxidatively in order to accelerate the drying process. These driers are, in chemical terms, metal soaps and can be present either in solid form or in dissolved form. However, they can also be employed in water-emulsifiable form in combination with emulsifiers. As acid component, it is possible to use, for example, aliphatic carboxylic acids such as octanoic acid or fatty acids, naphthenic acids and also resin acids. As primary driers, which directly accelerate the oxidation of the fat derivatives, use is made of corresponding salts of cobalt, manganese or lead, preferably cobalt or manganese. As secondary driers, which have no catalytic action on their own but act synergistically in combination with the abovementioned driers, it is possible to use salts of zinc, iron, calcium, cerium, lead and barium. Finally, salts of zirconium and aluminum can be used as coordinative driers. Examples of commercial driers are the commercial products Additol VXM 6206 and 4940, Solingen, Cobalt 10, linseed oil varnish, Nuodex Cerium 6 and Zink 8, Alusec 591 and Nourydrier 973. However, the abovementioned salts can be omitted if the fat derivatives according to the invention containing at least one carboxyl group are used. In this case, it is possible to use inorganic salts, for example hydroxides, of the abovementioned metals so that the driers are formed in situ. The driers are usually used in amounts of from 0.01% by weight to 1% by weight, based on the auxiliary.

Further constituents of the composition of the invention can be substances which act as wetting agents and reduce the water requirement. These are usually referred to as fluidizers. Examples are alkylarylsulfonates, salts of lignosulfonic acid and melamine resins. A review of such compounds is given, for example, by the article in "Zement, Kalk, Gips" Volume 21, pages 415 to 419 (1968). These fluidizers are usually added to the composition of the invention in amounts of from 0 to 10%.

It is also possible to increase the water requirement of the composition by addition of substances having a flocculating action, for example polyethylene oxides, as are described, for example, in GB-A-1049184. These auxiliaries can be added in amounts of from 0 to 10% by weight, based on the composition.

Stabilization of a slurry of water and the composition of the invention, for example to avoid sedimentation or demixing, can generally be achieved by addition of chemicals having a thickening action, for example cellulose ethers and starch ethers or alginates. It is likewise possible to use swellable fibers. These thickeners are added to the composition of the invention in amounts of from 0 to 5% by weight, based on the composition.

Further additives in the composition of the invention can be known retarders which slow the setting process. They include, in particular, organic acids and their salts and also organic colloids which are formed, for example, as degradation products in the hydrolysis of high molecular weight natural products, for example proteins, and also salts of phosphoric acid or of boric acid. Dextrins and marshmallow root are also possibilities. The mechanism of retardation varies. Relatively high molecular weight colloids increase the induction period since they are nucleus poisons; other retarders slow the rate of dissolution of the hemihydrate and the growth of the dihydrate crystals. Retardation of anhydrite II is usually not of practical interest, since this transforms into the dihydrate slowly enough on its own and always has to be accelerated. The proportion of these components in the compositions of the invention can be from 0 to 5% by weight, based on the composition.

The composition of the invention may further comprise, for example, waterproofing agents, in particular waterproofing agents based on fat chemicals. Here, express reference is made to the components disclosed in WO 97/08112, which can also be used as waterproofing agents for the purposes of the present invention.

In the composition of the invention, the waterproofing agents are present in an amount of from about 0 to about 5% by weight, in particular up to about 3% by weight, for example about 0.1, 0.5, 1, 1.5 or 2% by weight.

The present invention likewise provides a process for preparing hydraulically setting compositions, in which a hydraulically setting, inorganic compound and an auxiliary according to the invention and, if desired, further additives, are mixed. The hydraulically setting, inorganic compound used is particularly preferably calcium sulfate.

The auxiliary can be mixed with the hydraulically setting, inorganic compound and, if desired, further additives in various ways. A first possibility is the single-component variant in which the finished composition comprises the hydraulically setting, inorganic compound, the auxiliary and, if used, the further additives. The user only has to add water, so that this variant is particularly preferred. The auxiliaries can be mixed purely physically with the pulverized hydraulically setting, inorganic compound and, if used, the further additives.

An alternative is naturally a two-component variant in which the hydraulically setting, inorganic compound is mixed at the point of use with water and, prior to, after or simultaneously with the addition of water, with the auxiliary and, if used, the further additives.

The amount of water used to make up the hydraulically setting compositions depends, as a person skilled in the art will know, on the type of starting material used. To achieve a flowable slurry of uniform consistency, a rotary furnace β-calcium sulfate hemihydrate, for example, requires more than does a calcium sulfate from the cooker process, this requires more than a multiphase calcium sulfate and the latter in turn more than an autoclave calcium sulfate. Furthermore, the amount of water also has a significant influence both on the density and on the strength of the gypsum product obtained. α-Calcium sulfate hemihydrates which can be molded with very small amounts of water give, without any special measures, gypsum products having a high density and high strength. β-Calcium sulfate hemihydrates and multiphase calcium sulfates require more water to achieve a flowable consistency than do α-calcium sulfate hemihydrates. They therefore give gypsum products of intermediate strength and higher elasticity at lower densities, as are frequently used in the building industry. To produce lightweight or porous gypsum products, it is possible not only to employ the abovementioned methods of introducing large pores but also to add, for example, hydrogen peroxide (evolution of $O_2$) or dilute acids and carbonates (evolution of $CO_2$)

A further aspect of the present invention is the use of a compound of the formula I or a polymer having a molecular weight ($M_n$) of at least 300 and containing at least one cationic group or at least one anionic group or both, or a mixture of two or more thereof, as auxiliary in hydraulically setting compositions, in particular in hydraulically setting compositions comprising calcium sulfate as hydraulically setting, inorganic compound.

A further object of the present invention is to use the compositions of the invention for the production of shaped bodies, in particular gypsum products.

For the purposes of the present invention, shaped bodies are, for example, prefabricated gypsum components which are widely used in the building industry in the form of cardboard-lined gypsum plasterboards, gypsum wall boards, gypsum ceiling boards and dry flooring boards. An overview of these is given in Ullmanns Enzyklopädie der technischen Chemie, Volume 12, page 307 (1976). Furthermore, the compositions of the invention can be used in the form of knifing fillers and plasters and renders, for example surfacing plaster, and here, for example, in further processing to produce gypsum plasters for application by machine and ready-to-use gypsum plasters. Finally, the compositions of the invention can also be used for flooring plasters, longwall dams in mining and, if based, for example, on α-calcium sulfate hemihydrate, as hard molding material in the roof tile industry, in metal foundry work and in dental technology. An overview of these applications is given in Ullmanns Enzyklopädie der technischen Chemie, Volume 12, page 308 f. (1976).

The present invention therefore also provides for the use of a composition according to the invention or a composition prepared according to the invention for producing shaped bodies, building compositions, plasters and renders and knifing fillers.

The invention further provides shaped bodies produced using a composition according to the invention or a composition prepared according to the invention.

The present invention is illustrated by the examples below. All percentages reported below are % by weight based on the total composition (without water), unless indicated otherwise.

EXAMPLES

The measurements of setting rates, water absorption capability and compressive strength were carried out as follows:

50 ml of water were in each case admixed with m the auxiliary indicated in the following tables and any further additives indicated. While stirring vigorously, 150 g of Raddichem 27 gypsum plaster ($CaSO_4 \times 0.5\ H_2O$) (manufacturer: Rethmann Lippewerk Recycling GmbH, density: 2.75 g/cm$^3$, bulk density: 1100 g/l) were then added. When the mixture was homogeneous, a test specimen was cast in an aluminum dish having a diameter of 95 mm and the setting rate was measured.

After storage for 4 days in the ambient atmosphere and drying for 4 days at 40° C. in a convection drying oven, the water absorption was determined. For this purpose, a KARSTEN tube was adhesively bonded onto the test specimen and filled with deionized water to the zero mark. After 24 hours, the decrease in the water level was read off.

To measure the compressive strength, a test specimen produced from a plaster mixture with the amount of auxiliary indicated in each case was laid in water for the time indicated in Table 1 and was subsequently dried at 40° C.

The compressive strength was measured in N/mm² in accordance with DIN 1168.

Abbreviations:

o.n. overnight
APB amidopropyl betaine

EXAMPLE 1

Measurement of the Decrease in Compressive Strength of Test Specimens [N/mm²] at the Same Consistency in Each Case

TABLE 1

| Decrease in compressive strength [N/mm²] | | |
|---|---|---|
| | without auxiliary | |
| Initial value | 61.2 | |
| 2 days storage in water + redrying | 37.0 | |
| 7 days storage in water + redrying | 30.7 | |
| With auxiliary | 0.5% of auxiliary[1] | 2% of auxilairy[1] |
| Coconut APB | | |
| Initial value | 37.3 | 19.9 |
| 2 days storage in water + redrying | 37.5 | 19.3 |
| 7 days storage in water + redrying | 31.0 | 17.3 |
| Trimethyl betaine | | |
| Initial value | 42.6 | 33.0 |
| 2 days storage in water + redrying | 42.3 | 29.9 |
| 7 days storage in water + redrying | 42.4 | 30.7 |

[1]Active substance based on amount of gypsum plaster

EXAMPLE 2

Measurement of the Influence of the Amount of Auxiliary on Setting Time, Amount of Antifoam and Amount of Accelerator Used

TABLE 2

| Influence of the amount of auxiliary on setting time, amount of antifoam and amount of accelerator | | |
|---|---|---|
| Coconut APB | 0.5% addition | 2% addition |
| Amount of antifoam[1] | 1% | 4% |
| Setting time | 3–4 h | 12–16 h |
| Amount of accelerator | 1–2% | 5% |

[1]Agitan P 803 (Münzing), based on amount of gypsum plaster

EXAMPLE 3

Measurement of the Influence of Various Auxiliaries on Water Absorption and Setting Time without Accelerator

TABLE 3

Influence of various auxiliaries on water absorption and setting time without accelerator

| No. | Composition | Active substance[3] | Setting time | Dihydrate [%] | WST24[1] [ml] |
|---|---|---|---|---|---|
| 1 | Coconut APB (aqueous solution) | 2% | o.n. | 95 | <1 |
| 2 | Coconut APB (powder) | 5% | o.n. | 95 | <1 |
| 3 | | 1% | o.n. | n.m.[2] | <1 |
| 4 | | 0.2% | o.n. | n.m.[2] | <1 |
| 5 | $C_{8-10}$-APB | 0.5% | o.n. | n.m.[2] | <1 |
| 6 | Coconut betaine | 0.2% | o.n. | n.m.[2] | <1 |
| 7 | | 0.5% | o.n. | n.m.[2] | <1 |
| 8 | | 2% | o.n. | 80 | <1 |
| 9 | Stearic acid ABP | 1% | o.n. | >95 | <1 |
| 10 | | 5% | o.n. | 70 | <1 |
| 11 | Palmitic acid ABP | 1% | o.n. | 90 | <1 |
| 12 | | 5% | o.n. | 50 | <1 |

[1]Water absorption in 24 h
[2]not measured
[3]based on gypsum plaster

EXAMPLE 4

Measurement of the Influence of Various Auxiliaries on Water Absorption and Setting Time with Accelerator (5% by Weight of Calcium Sulfate Dihydrate)

TABLE 4

Influence of various auxiliaries on water absorption and setting time with accelerator (5% by weight of calcium sulfate dihydrate)

| No. | Composition | Active substance[3] | Setting time | Dihydrate [%] | WST24[1] [ml] |
|---|---|---|---|---|---|
| 1 | Coconut APB (aqueous solution) | 2% | 1 h | 95 | <1 |
| 2 | Coconut APB (powder) | 1 + 5% | 1 h | 95 | <1 |
| 3 | $C_{8-10}$-APB | 0.5% | 1 h | 2 | 1 ml/h |
| 4 | Coconut betaine | 1% | 1 h | 80 | <1 |
| 5 | Polymer[4] | 5% | 1½ h | 90 | <1 |

[1]Water absorption in 24 h
[2]not measured
[3]based on gypsum plaster
[4]prepared by free-radical polymerization of 50 mol % of methacrylamidopropyltrimethylammonium chloride (MAPTAC), 17.7 mol % of sodium acrylate and 35.3 mol % of ethyl acrylate in water

TABLE 5

Ether carboxylic acids as auxiliaries

| No. | C chain | EO units | Setting time | | WST24 | | DH content | |
|---|---|---|---|---|---|---|---|---|
| | | | unaccelerated | accelerated | unaccelerated | accelerated | unaccelerated | accelerated |
| 1 | | | | | | | | |
| 2 | 8 | 6 | o.n. | 3 h | <1 ml | <1 ml | >80% | >80% |
| 3 | 8 | 9 | o.n. | 1 h | <1 ml | <1 ml | 90% | >80% |
| 4 | 12–14 | 11 | 3½ h | 1½ h | <1 ml | <1 ml | 90% | >80% |
| 5 | 18–1[1] | 10 | 5 h | 1 h | <1 ml | <1 ml | 80% | >80% |
| 6 | 18–0[2] | 9 | 3½ h | 1½ h | 1 ml | <1 ml | 80% | >80% |

[1] 18 carbon atoms, 1 C—C double bond
[2] Stearamido ether carboxylic acid with q = 2, no C—C double bond

What is claimed is:

1. A hydraulically setting composition comprising from 20 to 99.9% by weight of a hydraulically setting, inorganic substance, from 0 to 79.95% by weight of additives and from 0.05 to 30% by weight of an auxiliary, wherein the auxiliary comprises: at least one member selected from the group consisting of a) compounds of the formula $$A(-X[-CH_2]_p-ZY)_k \quad (I),$$

where A is a member selected from the group consisting of linear or branched $C_{1-24}$-alkyl groups which may be unsubstituted or substituted with from 1 to 4 OH groups, linear or branched $C_{2-24}$-alkenyl groups which may be unsubstituted or substituted with from 1 to 4 OH groups, unsubstituted $C_{6-24}$ aryl groups and alkyl-substituted $C_{6-24}$-aryl groups, each having the valence k, Z is independently $SO_3^-$ or $COO^-$, Y is independently a proton, a metal ion, or an ammonium ion, p is from 1 to 30 and X may be identical or different and are each, independently of one another, a member selected from the group consisting of $$\underset{\|}{\overset{O}{C}}-L(-CH_2)_{\overline{q}}-E \quad \text{and} \quad (III)$$

$$\begin{array}{c} R^1 \\ | \\ N^+ \\ | \\ R^2 \end{array} \quad (IV)$$

where E is $$O-(CH_2-CH_2-O-)_nCH_2-CH_2-O, \quad (V)$$

where E is $$O-(CH_2-CH_2-O-)_nCH_2-CH_2-O \quad (V),$$

n is from 0 to 30, k is from 1 to 4, q is from 1 to 10, L is O, S or $NR^3$, and $R^1$ and $R^2$ are identical or different and are each, independently of one another, a linear or branched $C_{1-12}$-alkyl group, and $R_3$ is H or a linear or branched $C_{1-12}$ alkyl group;

b) polymers having a molecular weight ($M_n$) of at least 300 selected from the group consisting of polymers which contain cationic groups, polymers which contain cationic groups and anionic groups and polymers which contain anionic groups and no cationic groups containing residues of at least one monomer containing at least one anionic group, or a mixture of residues of two or more monomers containing at least one anionic group which polymer contains at least one residue selected from the group consisting of residues of acrylic acid, methacrylic acid, crotonic acid, 2-acrylamide-2-methyl sulfonic acid, vinyl phosphonic acid, vinyl sulfonic acid, styrene sulfonic acid, 2-sulfoethyl methacrylate, allylusulfonic acid, dimethylol propionic acid, 9,10-dihydroxy stearic acid, glutamic acid, unsaturated fatty acid, phthalic acid, abietic acid, succinic acid, aspartic acid, dimer fatty acid and trimellitic acid, c) a mixture of at least one polymer having a molecular weight (Mn) of at least 300 which contains at least one member selected from the group consisting of cationic groups, anionic groups and both cationic and anionic groups with at least one compound of the formula $A-(X(CH_2)_p-ZY)_k$ (I) where A is a member selected from the group consisting of linear or branched $C_{1-24}$-alkyl groups which may be unsubstituted or substituted with from 1 to 4 OH groups, linear or branched $C_{2-24}$-alkenyl groups which may be unsubstituted or substituted with from 1 to 4 OH groups, unsubstituted $C_{6-24}$ aryl groups and alkyl-substituted $C_{6-24}$-aryl groups, each having the valence k, Z is independently $SO_3^-$ or $COO^-$, Y is independently a proton, a metal ion, or an ammonium ion, p is from 1 to 30 and X may be identical or different and are each, independently of one another, a member selected from the group consisting of $$\underset{\|}{\overset{O}{C}}-N(-CH_2)_{\overline{m}}\underset{|}{\overset{R^1}{N^+}} \quad (II)$$
$$\phantom{xxxxx}| \phantom{xxxxxxx} | $$
$$\phantom{xxxxx}R^3 \phantom{xxxxx} R^2,$$

$$\underset{\|}{\overset{O}{C}}-L(-CH_2)_{\overline{q}}-E \quad \text{and} \quad (III)$$

$$\begin{array}{c} R^1 \\ | \\ N^+ \\ | \\ R^2 \end{array} \quad (IV)$$

where E is $$O-(CH_2-CH_2-O-)_nCH_2-CH_2-O \quad (V),$$

n is from 0 to 30, m is from 2 to 8, k is from 1 to 4, q is from 1 to 10, L is O, S or $NR^3$, $R^1$ and $R^2$ are identical or different and are each, independently of one another, a linear or branched $C_{1-12}$-alkyl group and $R^3$ is H or a linear or branched $C_{1-12}$-alkyl group.

2. The composition as claimed in claim 1 wherein n is from 5 to 20.

3. The composition as claimed in claim 1 wherein m is from 2 to 6.

4. The composition as claimed in claim 1 wherein $R^1$ and $R^2$ are each, independently of one another, $CH_3$ or $CH_3$—$CH_2$.

5. The composition as claimed in claim 1 wherein k is 1.

6. The composition as claimed in claim 1 wherein L is NH.

7. The composition as claimed in claim 1 wherein q is 2, 3 or 4.

8. The composition as claimed in claim 1 wherein the polymer comprises a copolymer comprising residues of a member selected from the group consisting of acrylic acid, methacrylic acid, and mixtures thereof and at least one monomer bearing a quaternary or quaternizable N atom.

9. The composition as claimed in claim 1 wherein the polymer is a terpolymer comprising residues of butyl acrylate, acrylic acid and dimethylaminopropylamide.

10. The composition as claimed in claim 1 wherein the additive comprises a composition selected from the group consisting of rheological aids, solvents, antifoams, accelerators, fillers, driers, dyes, preservatives, rust inhibitors, waterproofing agents, pigments and mixtures thereof.

11. The composition as claimed in claim 1 wherein the hydraulically setting, inorganic substance comprises calcium sulfate.

12. The process for preparing hydraulically setting compositions, which comprises forming a mixture comprising the hydraulically setting, inorganic substance and the auxiliary as claimed in claim 1.

13. The composition of claim 12 wherein the hydraulically setting, inorganic substance comprises calcium sulfate.

14. A shaped body comprising the composition as claimed in claim 1.

15. The composition of claim 2, where, M is from 2 to 6.

16. The composition of claim 2 wherein and $R^1$ and $R^2$ are each, independently of one another, $CH_3$ or $CH_3$—$CH_2$.

17. The composition as claimed in claim 2 wherein K is 1.

18. The composition as claimed in claim 2 wherein L is NH.

19. The composition as claimed in claim 2 wherein q is 2, 3 or 4.

20. The composition as claimed in claim 15 wherein $R^1$ and $R^2$ are each independently of one another $CH_3$ or $CH_3$—$CH_2$.

21. The composition of claim 20 where in K is 1.

22. The composition of claim 21 wherein L is NH.

23. The composition of claim 3 wherein $R^1$ and $R^2$ are each, independently of one another, $CH_3$ or $CH_3$—$CH_2$.

24. The composition of claim 2 wherein the polymer comprises a copolymer comprising a member selected from the group consisting of acrylic acid residues, methacrylic acid residues and mixtures thereof and the residues of at least one monomer bearing a quaternery or quaternizable N atom.

* * * * *

UNITED STATES PATENT AND TRADEMARK OFFICE
CERTIFICATE OF CORRECTION

PATENT NO.   : 6,565,645 B1  
DATED         : May 20, 2003  
INVENTOR(S)  : Klein et al.

It is certified that error appears in the above-identified patent and that said Letters Patent is hereby corrected as shown below:

<u>Title page,</u>  
Item [57], ABSTRACT,  
Line 6, delete "linlear" and insert -- linear --.  
Line 9, delete "valance" and insert -- valence --.

Delete " 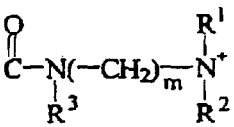 " and insert

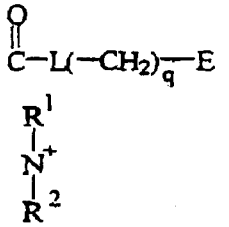

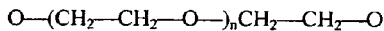

-- 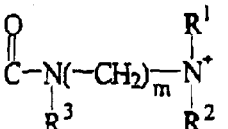 -- ;

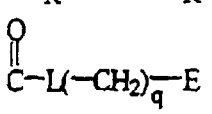

;

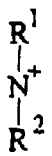

; or

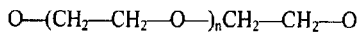

UNITED STATES PATENT AND TRADEMARK OFFICE
CERTIFICATE OF CORRECTION

PATENT NO. : 6,565,645 B1
DATED : May 20, 2003
INVENTOR(S) : Klein et al.

It is certified that error appears in the above-identified patent and that said Letters Patent is hereby corrected as shown below:

<u>Column 19,</u>
Line 53, delete one instance of "where E is
$$O-(CH_2-CH_2-O-)_nCH_2-CH_2-O \qquad (V)".$$

<u>Column 20,</u>
Line 31, delete "A—$(X(CH_2)_p$—$ZY)_k(I)$" and insert -- $A(-X(CH_2)_p-ZY)_k(I)$ --.

Signed and Sealed this

Twenty-third Day of May, 2006

JON W. DUDAS
*Director of the United States Patent and Trademark Office*